Patented Dec. 17, 1940

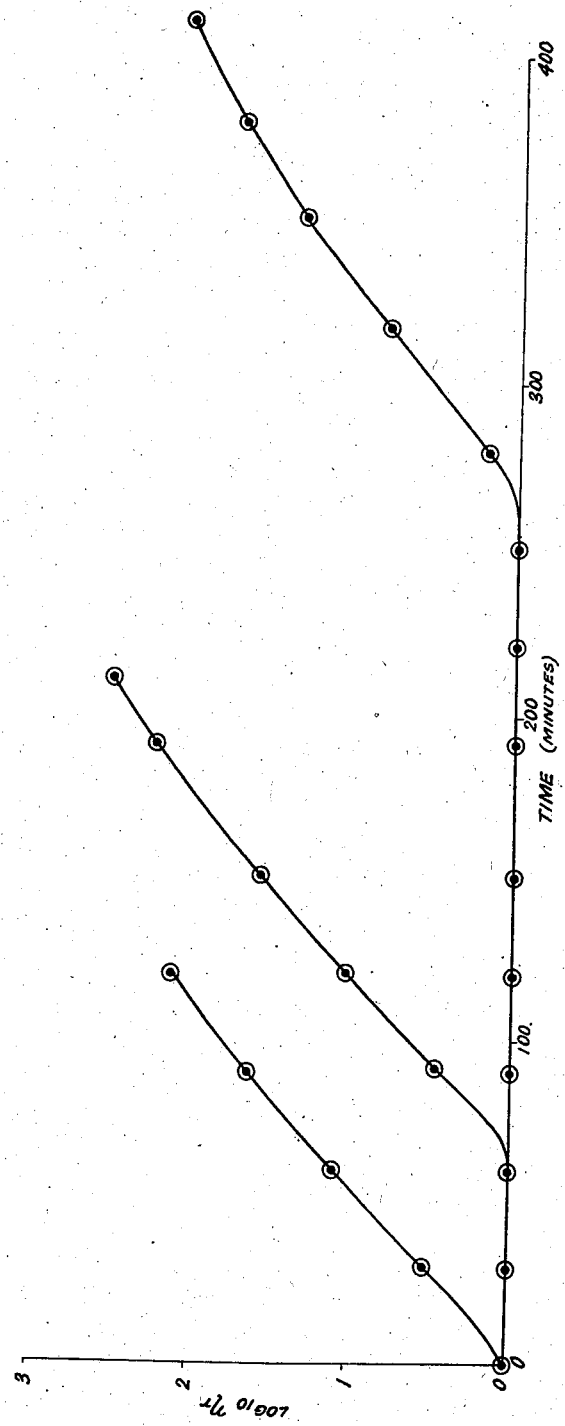

2,225,471

UNITED STATES PATENT OFFICE 2,225,471

STABILIZATION OF STYRENE

Stanley George Foord, London, England, assignor to International Standard Electric Corporation, New York, N. Y.

Application April 29, 1938, Serial No. 204,975
In Great Britain December 24, 1937

3 Claims. (Cl. 23—250)

This invention which is a continuation in part of my United States application No. 163,377 filed on September 11, 1937, relates to styrene stabilized against polymerization and to a process for producing the same. The invention also relates to polymerized styrene produced from such stabilized styrene and to a process for producing such polymerized styrene.

A certain amount of knowledge exists as to substances which will stabilize monomeric styrene, but such knowledge is very incomplete. It has been stated that agents adapted substantially to prevent polymerization of styrene are substances which are mild oxidizing agents, and are identified as substances which do not give up their oxygen in gaseous form. This class was stated to include quinone, mononitronaphthalene, trinitrotoluene, nitrobenzene, dinitrobenzene, trinitrobenzene and derivatives of these compounds such as pikramid. An organic oxidizing agent containing a benzene nucleus in which oxygen replaces hydrogen atoms, and more particularly quinone has been suggested for the same purpose. It was stated that quinone retards polymerization up to a temperature of 170° C. but above this temperature the action is reversed and quinone acts as an accelerator of polymerization. The proportion of quinone proposed to be used was from 0.25% to 1% by weight of the styrene whether as such or in solution, and it was stated that distillation of 2 to 3 hours at 140° C. in the presence of 1% of quinone produces not more than 0.2– 0.5% polymer, whereas in the absence of quinone or similar material a similar distillation gives 10–20% polymer.

It has also been stated that substances which are adapted to prevent oxidization of polymerizable compounds are also adapted to prevent polymerization thereof.

The prior knowledge relating to the stabilization of styrene was rather confused and did not distinguish clearly as to the precise effect of the substances that have been considered as stabilizing agents.

I have discovered that the action of a stabilizing agent upon styrene is not such as to prevent indefinitely the polymerization of the styrene. I have discovered that, on the contrary, a stabilizing agent that acts as an inhibitor of polymerization increases the natural short period during which no substantial polymerization takes place, which period I term an induction period. Thus by the addition of a stabilizing agent that acts as an inhibitor the natural short time induction period of styrene at normal temperatures may be prolonged, and/or an extended induction period caused to occur at temperatures at which it would otherwise be inappreciable.

At the completion of the induction period the styrene commences to polymerize at a rate which rapidly increases to a maximum and then continues steadily, the rate of polymerization being a function of the temperature and of the nature and concentration of any stabilizing agent that may be added.

In considering the action of stabilizing agents, a distinction must be made between an inhibitor, which term will herein be used to denote a substance which when added to the styrene produces an appreciable increase in the natural short time induction period of the styrene, and a retarding agent, which term will herein be used to denote a substance which when added to the styrene reduces the rate at which polymerization takes place once it has started.

Substances to be added to styrene may be conveniently divided into groups according to their effect. These groups are (a) substances having no appreciable effect upon induction period or rate of polymerization; (b) polymerization accelerators; (c) retarding agents that are not inhibitors; (d) inhibitors that are not retarding agents or have only slight retarding action after the completion of the induction period; (e) inhibitors that are also retarding agents.

For substances in groups (d) and (e) the length of the induction period is dependent directly upon the amount of the substance added and also upon the temperature. The percentage of inhibitor required to produce a given length of induction period at a given temperature varies according to the particular stabilizing agent used.

The following table shows the lengths of the induction period of styrene caused by various inhibitors of the percentages given:

| Stabilizer | Percent added | Induction period at— | |
|---|---|---|---|
| | | 60° C. | 120° C. |
| Benzoquinone | .01 | 3 days | 15 minutes. |
| | .05 | 2 weeks | 70 minutes. |
| | .2 | 2 months | 4½ hours. |
| Catechol | .5 | 170 hours | Less than ½ hour. |
| xxChloranil | .2 | 6 weeks | 180 minutes. |
| 1.aminoanthraquinone | .2 | 110 hours | About ½ hour. |
| Toluquinone | .2 | 2 months | 270 minutes. |
| Phenyl 1.naphthylamine | .5 | 150 hours | Less than ¼ hr. |
| Phenyl 2.naphthylamine | .5 | 150 hours | Do. |
| Methylaniline | .5 | 40 hours | Do. |
| 2.4 diaminoazobenzene | .5 | 150 hours | Do. |
| Acenaphthenequinone | .5 | 220 hours | Less than 20 mins. |
| Hydroquinone | .5 | 170 hours | Do. |
| p.Phenylenediamine | .5 | 150 hours | 20 minutes. |
| xxMetol | .5 | 110 hours | Less than 10 mins. |
| xxHexamine | .5 | 50 hours | Do. |
| xxHydroxylamine hydrochloride | .5 | 50 hours | Do. |
| xxResorcinol | .5 | 30 hours | Do. |
| o.Nitro p.cresol | .5 | 400 hours | Less than ½ hr. |
| 1.5 dinitroanthraquinone | .5 | 350 hours | Do. |
| p.Nitrosodimethylaniline | .2 | 7 weeks | 230 minutes. |
| Styrene (for comparison) | | 10 hours | 5 minutes. |

It may be noted that in the case of those substances marked xx the times given at 60° refer to measurements made with an excess of the inhibitor present due to the fact that the substances are not soluble in styrene up to .5%, whereas in the case of the times given at 120° C. the measurements relate to saturated solutions of the inhibitor in styrene with no excess e. g. concentrations of less than .2% of the inhibitor.

The principal use of an inhibitor is to prevent or substantially prevent any polymerization of styrene at room temperature. The induction period for each of the above substances is given at 60° C. instead of at room temperature because of the length of time that would be necessary to verify the length of the induction period at room temperature, since such induction period may run into years.

The induction period at room temperature has been verified in the case of 0.01% of quinone and the induction period at several temperatures (60° C. and above) has been determined for a large number of the above mentioned substances and the relative lengths of such periods are such that it may be stated with confidence that the standard method of interpolation may be employed to determine from such results the length of the induction period at room temperature. It has been verified that the length of the induction period at 60° C. is proportional to the percentage of inhibitor added and this has also been verified at room temperatures for some substances. Thus pure styrene remains stable at 25° C. (i. e. approximately room temperature) for about five weeks in the dark; with 0.01% of quinone added for not less than 25 weeks; with 0.02% quinone for not less than 50 weeks and with 0.05% quinone for about 150 weeks.

According to one feature of the invention a process of treating styrene consists in adding to the styrene a percentage of inhibitor dependent upon the length of the period during which polymerization is required to be prevented, and upon the temperature to which the styrene is to be subjected.

The curves in the accompanying drawing illustrate the effect of an inhibitor upon the course of polymerization of styrene at 120° C. Abscissae represent time in minutes and ordinates the logarithm of the relative viscosity, that is of the ratio of the viscosity at the moment under consideration to the initial viscosity.

Curve A shows the increase in the relative viscosity of styrene that has previously been redistilled under reduced pressure and therefore can be taken as pure styrene.

Curve B shows the changes in relative viscosity of styrene to which .05% of quinone has been added. It will be observed that there is an induction period of about 70 minutes and that thereafter the viscosity increases at the same rate as for pure styrene. During the induction period the deep yellow colour of the quinone gradually disappears and it may be assumed that a slow reaction between the quinone and the styrene occurs, the product of such reaction having a pale yellow colour. The end of the induction period coincides with the disappearance of the quinone colour.

Curve C shows the changes in viscosity of styrene to which .20% of quinone has been added. It will be noted that there is a considerable increase in the length of the induction period. It will also be noted that in curve C the rate of increase with time of the relative viscosity is less than with curves A and B. The rate of increase of the relative voscosity is only a true indication of the rate of polymerization when the specific viscosity of the polymers formed is the same. Long chain polymers have a higher specific viscosity than short chain polymers and in the case of curve C I believe that there is a slight decrease in the length of chain of the polymers formed and therefore a slight fall in the specific viscosity. Thus the decrease in the slope of curve C is not in my opinion entirely due to a decrease in the rate of polymerization but apparently some decrease does occur in the present instance i. e. in the above example.

Decrease in the length of the polymeric molecules renders the polymer correspondingly more brittle and for this reason the amount of inhibitor added to the styrene must be limited to such as will not introduce this property where such property is undesirable.

In the case of many of the inhibitors listed above, there is very little difference in the rate of increase of the relative viscosity as compared with pure styrene. This is true for example, in the case of metol, hexamine, hydroxylamine hydrochloride and resorcinol. In the case of most of the remaining substances although there may be a decrease in the specific viscosity, there is very little decrease in the rate of polymerization. The two substances, catechol and o. nitro p. cresol are, however, an exception in that the rate of increase of the relative viscosity at the end of the induction period is very considerably decreased. With these two substances, therefore, it will be advisable to remove any excess of the inhibitor that may remain at the time when polymerization is required, by distillation or by washing out the excess of the inhibitor with caustic soda. With the substances other than catechol or o. nitro p. cresol, however, it will be noted that if it be desired to polymerize the styrene at a temperature of 120° C. or below, it is only necessary to heat the styrene containing the stabilizing agent for a comparatively short time at about 120° C. in order to destroy the stabilizing action of the inhibitor almost entirely. The time of heating required for polymerizing the styrene is thus only a comparatively short time longer than the normal period. As illustrated in the drawing, the induction period of styrene containing .05% of quinone is less than 70 minutes and therefore if it be desired to polymerize styrene containing this percentage of quinone at 120° C. the time of heating required is prolonged by the induction period of 70 minutes only.

According to another feature of the invention, therefore, a process of treating styrene comprises adding to monomeric styrene an inhibitor in such amount as to prevent or substantially prevent polymerization of the styrene during an extended period, heating the said styrene to remove the inhibiting effect without distilling the styrene and thereafter polymerizing.

Certain of the substances mentioned in the table above are not as has been explained above soluble in styrene to the extent of the proportion given in the second column of the table. Such substances are catechol, hexamine, hydroquinone, metol, hydroxylamine hydrochloride, resorcinol, 1.5 dinitroanthraquinone and p. phenylenediamine. For the purpose of stabilizing styrene for a given period, however, it is only necessary to add to the styrene the required amount of the inhibitor. Some of the inhibitor dissolves in the styrene to form a saturated solution, but the inhibitor appears to react slowly with the styrene, and it appears to be by virtue of this reaction that the substance inhibits polymerization. Accordingly the inhibitor in solution is used up and more goes into solution. Whatever may be the theoretical explanation the undissolved excess of inhibitor is gradually used up during the induction period. As an example, reference is directed to hydroquinone. I have discovered that hydroquinone is only very sparingly soluble in styrene, at room temperature to the extent of .001%. Nevertheless, 0.2% of hydroquinone added to the styrene will provide an induction period of some months at room temperature, the .001% originally in solution being used up and more hydroquinone going into solution during the continuance of the induction period.

Hydroquinone is known as a stabilizing agent for styrene and is used by adding comparatively large percentages to the styrene. When it is desired to polymerize the styrene, it is distilled to remove the hydroquinone or the latter is washed out with caustic soda.

I have discovered, however, as stated above that quite small percentages of hydroquinone may be used to inhibit polymerization of styrene for an extended period, and I have discovered the relationship between the length of the induction period and the amount of hydroquinone added. Moreover, I have discovered that, even if hydroquinone (or other of the sparingly soluble inhibitors) has been added to styrene in such excess that it is desired to polymerize the styrene at a time at which there is still undissolved inhibitor present, it is only necessary to filter off this undissolved substance, and polymerization by heating can then be done with an inappreciable increase of the length of time required to complete polymerization. It will be observed from the table given that in all cases of difficultly soluble substances listed above the induction period at 120° C. of styrene to which has been added the percentages of the respective substances mentioned is less than half an hour and for the percentages needed to form a saturated solution at room temperature it is only a few minutes. Thus the induction period at 120° C. of styrene containing .001% of dissolved hydroquinone is certainly not more than 10 minutes, i. e. inappreciably greater than that of pure styrene.

According to another feature of the invention, therefore, a process of treating styrene comprises adding to monomeric styrene a sparingly soluble inhibitor in an amount sufficient to maintain a saturated solution of said inhibitor in the styrene for an extended period, filtering off undissolved inhibitor, heating the filtrate to destroy the inhibiting effect of any dissolved inhibitor and thereafter polymerizing.

It is to be understood that this process applies to such sparingly soluble inhibitors as do not greatly retard the rate of increase of viscosity during polymerization. This is the case with all the sparingly soluble inhibitors mentioned above with the exception of catechol.

If the polymerized styrene is to be used for electrical purposes it is desirable that the inhibitor added should not increase the power factor of the polymerized styrene. Since an inhibitor is gradually used up in forming a compound with the styrene it is the power factor of this compound which comes into consideration. If the amount of inhibitor that must be added to stabilize the styrene for a particular period is so high that the resulting compound with styrene is present in such proportions and/or has such a high electric moment that the power factor is considerably increased, the use of such an inhibitor is undesirable in cases in which the polymerized styrene is required for electrical purposes. From the electrical point of view either quinone or hydroquinone is very suitable as an inhibitor. Although percentages above .25% of quinone unduly increase the power factor of polymerized styrene at $10^6$ cycles per second, it will be seen from the above table that quinone may be used in lesser quantities to stabilize styrene for quite lengthy periods at room temperature. The power factor of monomeric styrene containing 0.05% of quinone is inappreciably higher than that of the styrene alone. The power factor of polymerized styrene containing the reaction product of styrene with quinone, when 0.05% of quinone has been added is not appreciably greater than in the absence of the quinone.

It should be noted that if styrene has approached or even passed the end of its induction period during storage, the addition of amounts of an inhibitor according to the invention prevents further polymerization during an induction period depending upon the amount of the inhibitor added.

Since the inhibitor employed acts as an inhibitor during a period within which it is reacting with or is present in the styrene it is to be expected that the presence of other substances mixed with the styrene does not interfere with the stabilizing effect provided that these other substances are such as do not react with the inhibitor.

A plasticizing agent is frequently added to monomeric styrene to secure greater plasticity in the polymerized styrene formed from the monomeric styrene. It is to be expected that the presence of a plasticizing agent does not interfere with the stabilizing action of any of the inhibitors in accordance with the invention provided that no reaction takes place between the inhibitor and the plasticizer. I have verified the reaction of quinone in the case of certain plasticizing agents. I have found, for example, that the further addition of quinone to a mixture of 90% by volume of styrene and 10% of a chlorinated diphenyl (which latter has been added to act as a plasticizing agent), produces an induction period of a magnitude which is dependent only upon the amount of quinone, and which is independent of the presence of the chlorinated diphenyl. Moreover, quinone has no appreciable effect on the subsequent polymerization reaction, after the end of the induction period. It is to be understood that the amount of quinone to be added for stabilizing such a mixture of styrene and plasticizing agent for a given period of time is based upon the weight of styrene present in the mixture.

Obviously styrene stabilized in accordance with the present invention may be utilized in many ways, and as an example it may be mentioned that this stabilized styrene may be employed for impregnating fibrous material such as papers for use in power cable insulation.

A certain amount of generalization is possible as a result of my investigation of the action of various substances with respect to the polymerization of styrene. Thus, I have found that many quinosoid compounds give rise to a long induction period without materially affecting the subsequent rate of polymerization. A notable exception, however, is anthraquinone which I have found to have no effect on the polymerization of styrene.

Nitro groups are effective in retarding the rate of polymerization without so far as can be determined giving rise to an induction period and the retarding effect increases in accordance with the number of nitro groups present.

Phenolic OH groups are in general comparatively weak stabilizers. Phenol with only one OH group is quite ineffective, and cresol very feeble. The effectiveness increases with the number of OH groups but depends on the relative position of the groups. Thus hydroquinone, catechol and resorcinol lengthen the induction period, hydroquinone giving no and resorcinol very little retardation after the end of the induction period, whilst catechol gives a powerful retardation. Pyrogallol with three OH groups gives a strong retardation with very little increase in induction period.

In general amino groups tend to increase the induction period without materially reducing the rate of polymerization, but 1.5 diamino anthraquinone is an exception, since it gives a very short induction period and considerable retardation. Substitution of the hydrogen atoms in amino groups gives anomalous effects; thus aniline and dimethylaniline give only a small increase in induction period whilst methylaniline gives a relatively large one; 2 naphthylamine is more effective than 1 naphthylamine and substitution of one hydrogen atom of the amino group by phenyl gives a further increase in induction period.

The inorganic radicles have been found to be of no effect. It may be expected therefore that other inorganic salts of methyl p. aminophenol will have exactly the same effect as the sulphate (metol) since the organic groups are exactly the same.

Halogen substituted compounds do not differ in general in their effects from their parent substances.

Ketones, ethers and alcohols have no action. Pyridine also has no effect on polymerization at 60° C.

What is claimed is:

1. A stabilized styrene composition consisting of styrene and not more than about 0.5% of a stabilizer chosen from the group consisting of chloranil, 1-aminoanthraquinone, phenyl 1 naphthylamine, phenyl 2 naphthylamine, methylaniline, metaphenylenediamine, paraphenylenediamine, paranitrosodimethylaniline and metol, the stabilized styrene being stable under storage conditions, but having a polymerization rate at 120° C. substantially the same as unstabilized styrene.

2. A stabilized styrene composition consisting of styrene and not more than about 0.2% of paranitrosodimethylaniline.

3. A stabilized styrene composition consisting of styrene and not more than about 0.2% chloranil.

STANLEY GEORGE FOORD.